(12) United States Patent
Bracken et al.

(10) Patent No.: US 6,401,901 B1
(45) Date of Patent: Jun. 11, 2002

(54) BAGGAGE CHUTE APPARATUS

(75) Inventors: Daniel Bracken, Rocky River; Richard Kmetz, Parma; Paul Simon, Brook Park; John Hughes, Strongsville, all of OH (US)

(73) Assignee: United Air Lines, Inc., Elk Grove, IL (US)

( * ) Notice: Subject to any disclaimer, the term of this patent is extended or adjusted under 35 U.S.C. 154(b) by 0 days.

(21) Appl. No.: 09/192,176

(22) Filed: Oct. 30, 1998

(51) Int. Cl.⁷ .............................................. B65G 11/00
(52) U.S. Cl. .............................. 193/38; 193/4; 414/376
(58) Field of Search ........................ 193/4, 5, 6, 25 A, 193/25 C, 38; 414/397, 376; 244/137.1

(56) References Cited

U.S. PATENT DOCUMENTS

| | | |
|---|---|---|
| 276,973 A | 5/1883 | Kelly |
| 916,100 A * | 3/1909 | Brown |
| 981,613 A | 1/1911 | Carter |
| 1,256,515 A | 2/1918 | Brown |
| 2,297,544 A | 9/1942 | Elwood ........................ 227/39 |
| 2,487,613 A * | 10/1949 | Stone |
| 3,339,690 A | 9/1967 | Craig ............................ 193/6 |
| 3,827,590 A | 8/1974 | Lodjic ........................ 214/505 |
| 3,843,987 A | 10/1974 | Lodjic ............................ 14/71 |
| 4,179,017 A * | 12/1979 | Tilley |
| 4,369,538 A | 1/1983 | Smedal ........................ 14/69.5 |
| 4,381,834 A * | 5/1983 | Leinenger .................... 193/35 |
| 4,436,518 A | 3/1984 | Buss ........................... 428/595 |
| 4,517,698 A | 5/1985 | Lamp'l et al. ............... 14/72.5 |
| 4,577,725 A | 3/1986 | Hunter ......................... 182/48 |
| 4,589,519 A | 5/1986 | Hunter ......................... 182/48 |
| 4,634,285 A | 1/1987 | Newberry .................... 366/68 |
| 5,056,641 A * | 10/1991 | Loefke et al. ............ 193/25 A |
| 5,086,902 A | 2/1992 | Dunnigan ................. 193/25 C |
| 5,660,260 A * | 8/1997 | Bareiss |
| 5,673,779 A | 10/1997 | Spickelmire ................... 193/6 |
| 6,109,854 A * | 8/2000 | Thompson, Jr. et al. .... 414/398 |

* cited by examiner

Primary Examiner—Robert P. Olszewski
Assistant Examiner—Steven B. McAllister
(74) Attorney, Agent, or Firm—Brinks Hofer Gilson & Lione

(57) ABSTRACT

A baggage chute for transferring baggage from an elevated level of an aircraft passenger boarding bridge to ground level. The chute includes at least one slide member which is shaped to form a truncated cylinder of arcuate cross-section and which has annularly extending ribs. A plurality of mounting members are used to fasten the slide member to the boarding bridge and to support the slide member. A baggage receiving area is attached near an end of the slide near ground level for receiving and retaining baggage. The receiving area includes a flexible member extending substantially across the receiving area for stopping the sliding of the baggage and which absorbs the impact of the baggage.

13 Claims, 4 Drawing Sheets

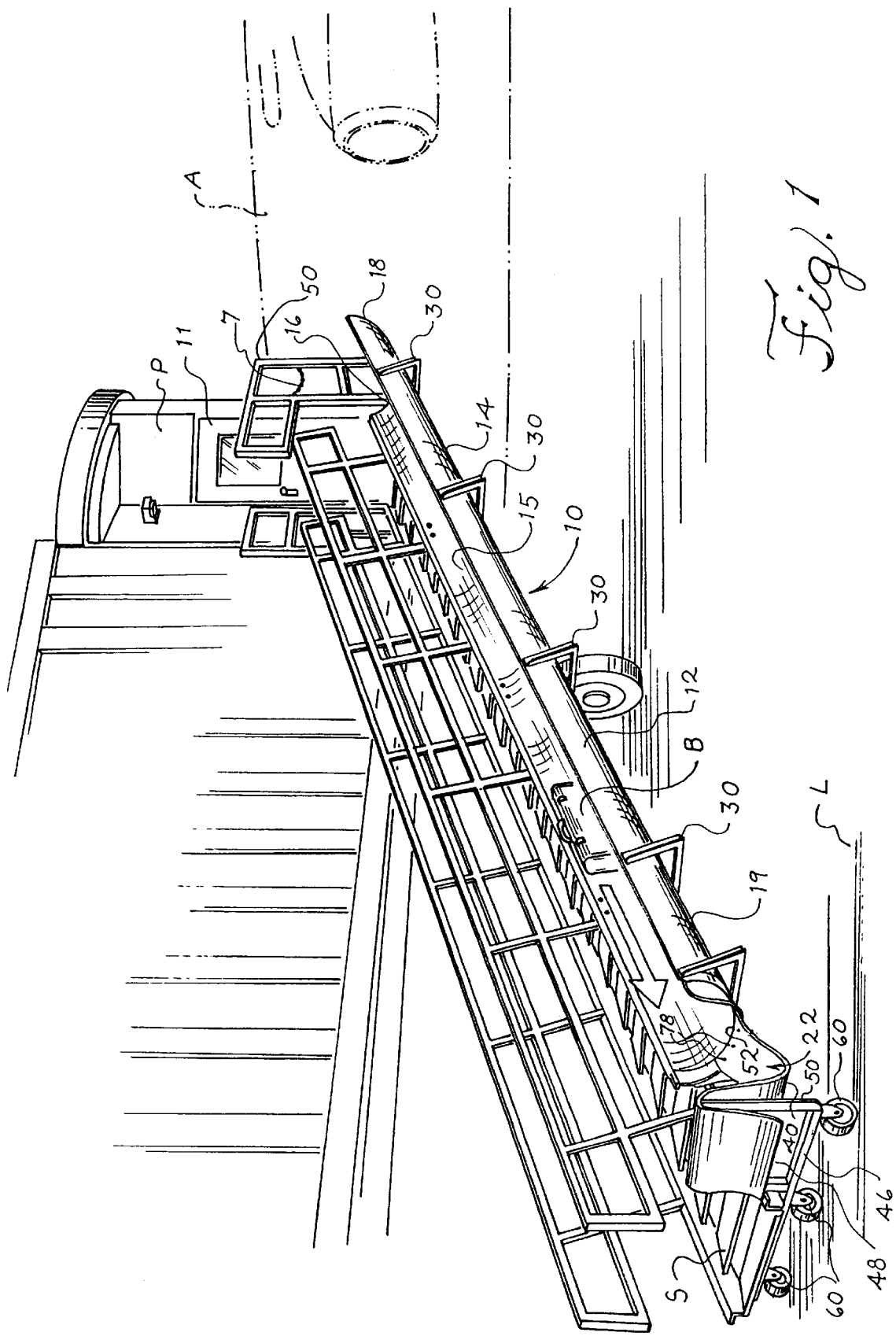

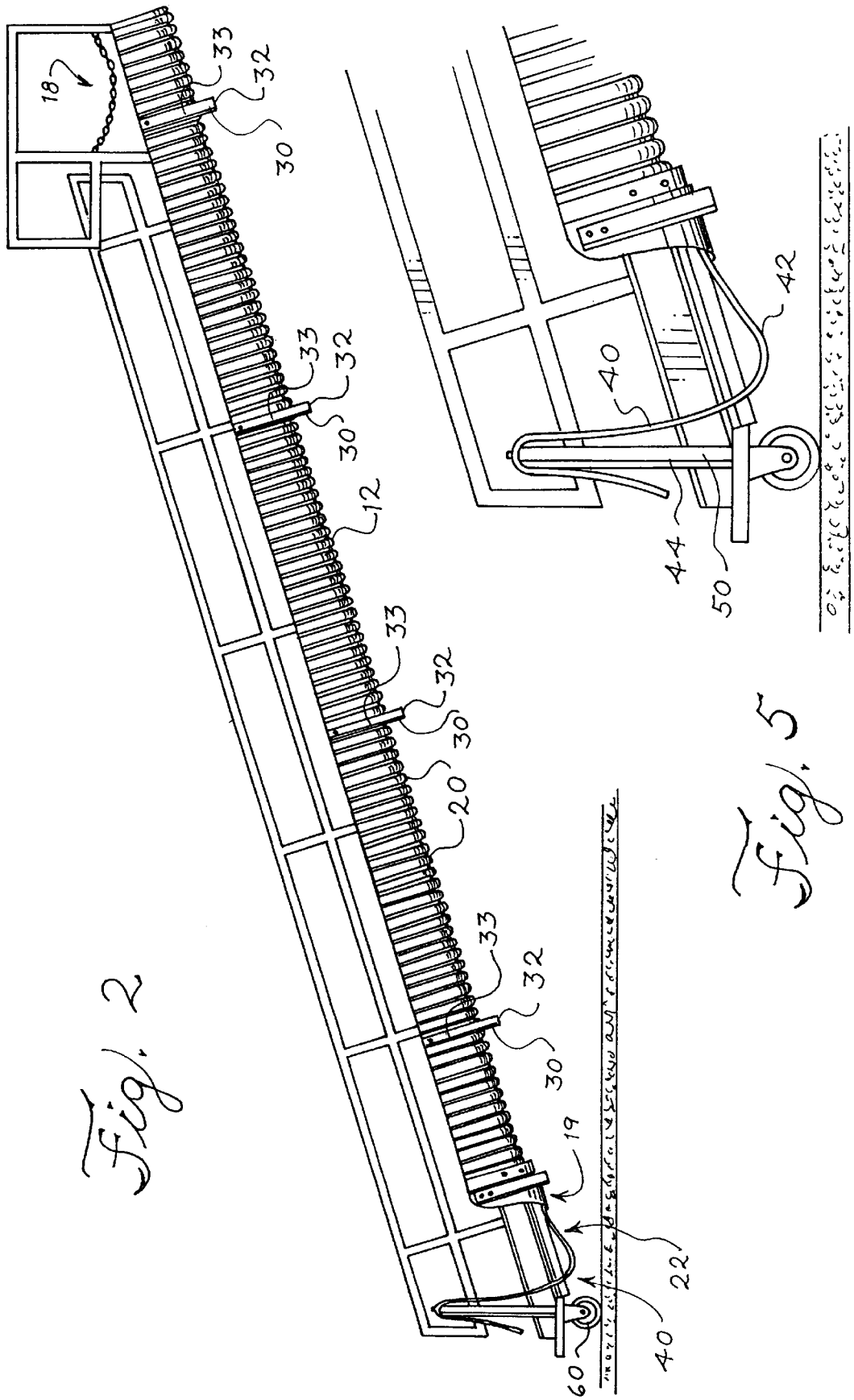

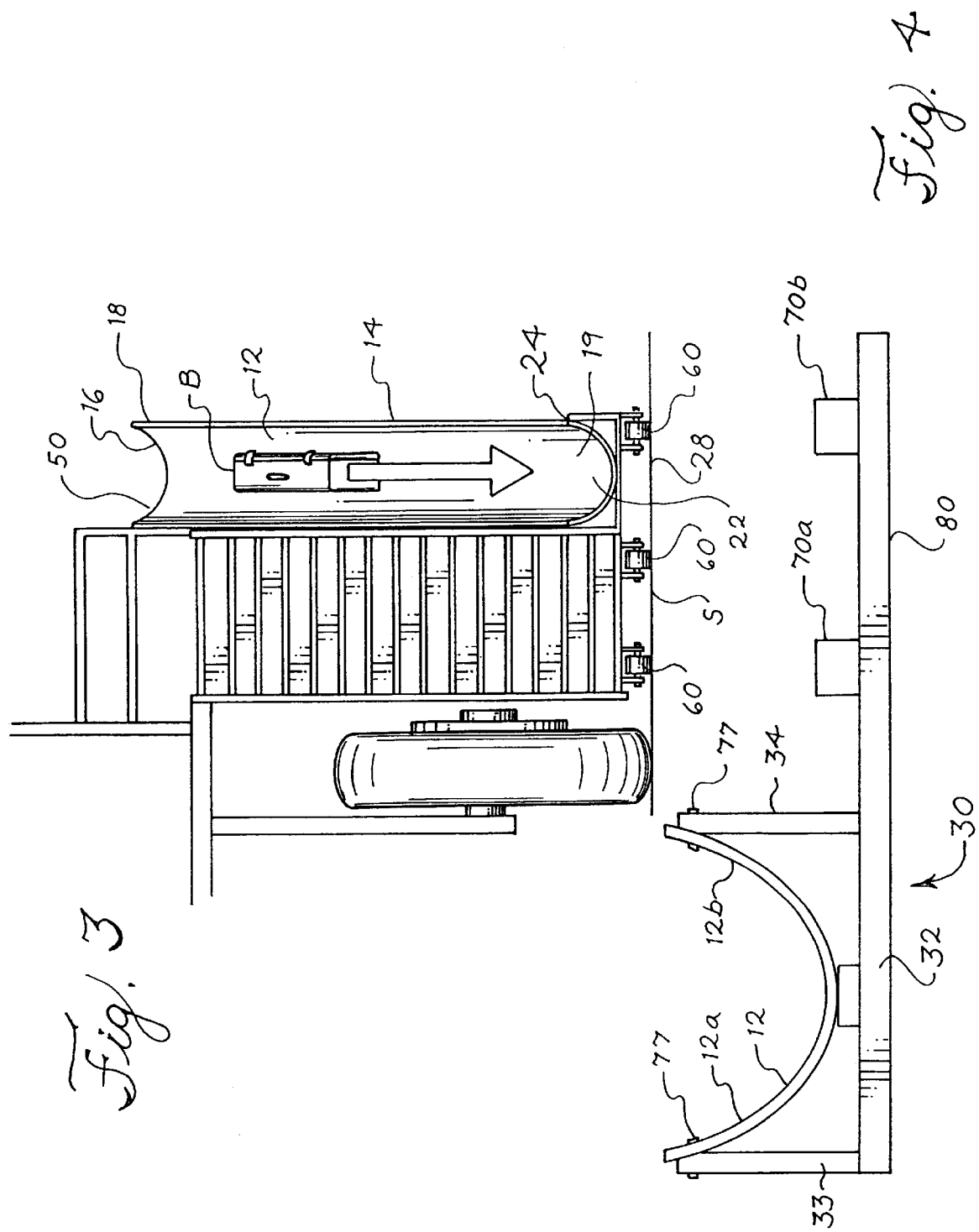

BAGGAGE CHUTE APPARATUS

BACKGROUND OF THE INVENTION

The present invention is directed to a baggage chute for transferring baggage, luggage and the like from a passenger boarding bridge to ground level for placing baggage, luggage and the like into the baggage hold of an aircraft. Presently, at many airports, passengers board and disembark from an aircraft by walking through an elevated boarding bridge which connects the inside of the airport to the passenger seating area of a waiting aircraft. In this manner, passengers do not need to walk across the tarmac to get into the aircraft, nor do they have to travel outside to board the aircraft. This is particularly advantageous when the weather is hot or cold and when it is raining or snowing outside.

Accordingly, many boarding bridges are moveable from different positions. Thus, once an aircraft is positioned outside of a gate at an airport, the boarding bridge is moved so that passengers and airline personnel can travel directly between the airport and the aircraft without traveling outside. Additionally, the boarding bridges may compensate for differences between the elevation of the airport and the passenger seating area of the aircraft. In particular, because larger aircraft typically have passenger seating areas elevated many feet above the ground level (that is, the level of the tarmac), boarding bridges dispense with the need for both stairs leading down to the tarmac and stairs back up to the aircraft.

Generally, the airport is elevated higher than the level of the passenger seating area of the aircraft, and thus boarding bridges slope slightly downward from the airport to the aircraft. Since the entry and exit doors of aircrafts are many feet off of the ground, and the height of the doors vary between different aircraft, boarding bridges may be moved up and down to accommodate different aircraft. Because airline personnel use the boarding bridge to service the aircraft, boarding bridges may also include an outside stairway which connects the boarding bridge (and thus the inside of the airport) with the ground level outside of the aircraft.

While passengers always travel in the passenger area of the aircraft, their baggage may travel with them in that area or in the baggage hold of the aircraft. Generally, when a passenger arrives at the airport, he or she "checks-in" with the airline at a ticket counter to confirm his or her ticket for a particular flight. At that time, the passenger usually decides where his or her baggage should be placed during the aircraft flight. The passenger may "check" the baggage, that is, have the baggage placed in the baggage hold of the aircraft. The baggage hold of a typical aircraft is usually located in a separate compartment beneath the passenger area. Access to the baggage hold is made through one or more hatches in the underside of the aircraft. Thus, hatches typically must be entered from the ground level.

If the passenger checks his or her baggage, the baggage is left with the airline personnel at the ticket counter or, in some instances, at the curb of the airport terminal, and airline personnel generally ensure that the baggage travels through the baggage handling system of the airport to the baggage hold of the aircraft that the passenger plans to take to his or her destination. In the alternative, the passenger may "carry on" his baggage, that is, carry the baggage onto the aircraft and store the baggage in a storage compartment in the passenger area of the aircraft, or, alternatively, underneath a passenger seat.

In some instances, passengers do not check their baggage when they check-in to confirm their flight, but when they arrive at the gate of the aircraft they plan to take, for some reason, the baggage needs to be placed into the baggage hold of the aircraft. For example, the baggage may not fit in the passenger area of the aircraft because of a lack of space for additional baggage or because that particular baggage is too large to fit within a storage space in the passenger area. In these instances, the baggage generally must be moved to the baggage hold of the aircraft.

At this point, however, the passenger is already at the aircraft gate, or even near or at the aircraft entrance. Accordingly, instead of having the passenger travel back to the ticket counter to check the baggage through the airport's baggage handling system, airline personnel can check the baggage at the gate. In the past, airline personnel would have to walk the gate-checked baggage down the outside stairs of the bridge out onto the tarmac to have the baggage directly placed in the baggage hold of the aircraft. This could be difficult or even hazardous for the airline personnel if the baggage was large, heavy or cumbersome. Later, chutes were added next to the stairs from the upper level of the boarding bridge to the lower ground level. The airline personnel could then slide the baggage down the chute from the boarding bridge level to ground level. These chutes are generally made of metal and are channel-shaped having straight sides, thereby having two side walls which were generally perpendicular to a bottom wall. However, these chutes were expensive, difficult to manufacture, and tended to fracture after relatively short periods of use. Furthermore, the chutes were heavy and placed significant structural stress on the stairs and boarding bridge.

Accordingly, there is a need for a baggage chute apparatus which is inexpensive, easy to manufacture, lightweight and long-lasting.

BRIEF SUMMARY OF THE INVENTION

One aspect of the present invention provides a baggage chute for transferring baggage from an elevated level of an aircraft passenger boarding bridge to ground level. The chute includes at least one slide member which is shaped to form a lightweight truncated cylinder of arcuate cross-section and has annularly extending ribs. In one embodiment, there are a plurality of slide members which are rigidly connected to provide an elongated slide. The slide has a plurality of mounting members for fastening the slide to the boarding bridge. A baggage receiving area is attached near an end of the slide near ground level for receiving and retaining baggage. The receiving area may include baggage holding means for stopping the sliding of the baggage and absorbing the impact between the receiving member and the baggage bumper member. Alternatively, the receiving area may include a bumper member which extends substantially across the receiving area for stopping the sliding of the baggage and absorbing the impact between the bumper member and the baggage.

Another aspect of the present invention provides an airline passenger boarding apparatus which includes a passenger boarding bridge elevated above ground level. The bridge includes at least one stairway linking the passageway with ground level. The apparatus also includes an elongated slide which is mounted adjacent the stairway via a plurality of mounting brackets. The slide has a generally uniform, arcuate shape and is elongated generally in a baggage-transport path. The slide further defines a plurality of annularly extending ribs. The slide may be comprised of a plurality of interconnected slide members. The mounting brackets extend toward the stairway, and support the arcuate cross-sectional shape of the slide. The apparatus also includes a baggage receiving area defined on the slide near ground level for receiving and retaining baggage transported on the slide. The receiving area may include baggage holding means for stopping the sliding of baggage down the slide. Alternatively, the receiving area may include a bumper member for stopping the sliding of the baggage down the slide.

Another aspect of the present invention provides a method for loading baggage from an elevated passenger boarding bridge onto an aircraft. First, a baggage chute is provided. The baggage chute is mounted adjacent the passenger boarding bridge. The chute includes a plurality of slide members shaped to form truncated cylinders of arcuate cross-section. The slide members have annularly extending ribs and are rigidly connected to provide an elongated slide. The slide has an upper end and a lower end so that the slide extends from its upper end at the level of the boarding bridge to its lower end at ground level. The baggage chute is also provided with a baggage receiving area formed near the lower end of the slide and thus near ground level. Next, the baggage is transferred from the boarding bridge to the upper end of the slide. Then, the baggage item is allowed to slide down the slide to come to rest against the bumper member at least partially within the baggage receiving area. Next, the baggage is retrieved from the baggage receiving area at the lower end of the slide. Last, the baggage is then placed onto the aircraft.

These and other objects, advantages, and features of the present invention will be better understood upon review of the following detailed description of the preferred embodiments.

BRIEF DESCRIPTION OF SEVERAL VIEWS OF THE DRAWINGS

FIG. 1 is a perspective view of the baggage chute of the present invention;

FIG. 2 is side view of the baggage chute of FIG. 1;

FIG. 3 is a front view of the baggage chute of FIG. 1 without the baggage holding means of the present invention;

FIG. 4 is a partial cross-sectional view of the mounting members for the baggage chute used in the inventions of the previous Figures;

FIG. 5 is an exploded side view of a portion of the baggage holding means of the present invention.

DETAILED DESCRIPTION OF THE INVENTION

Figure 6:
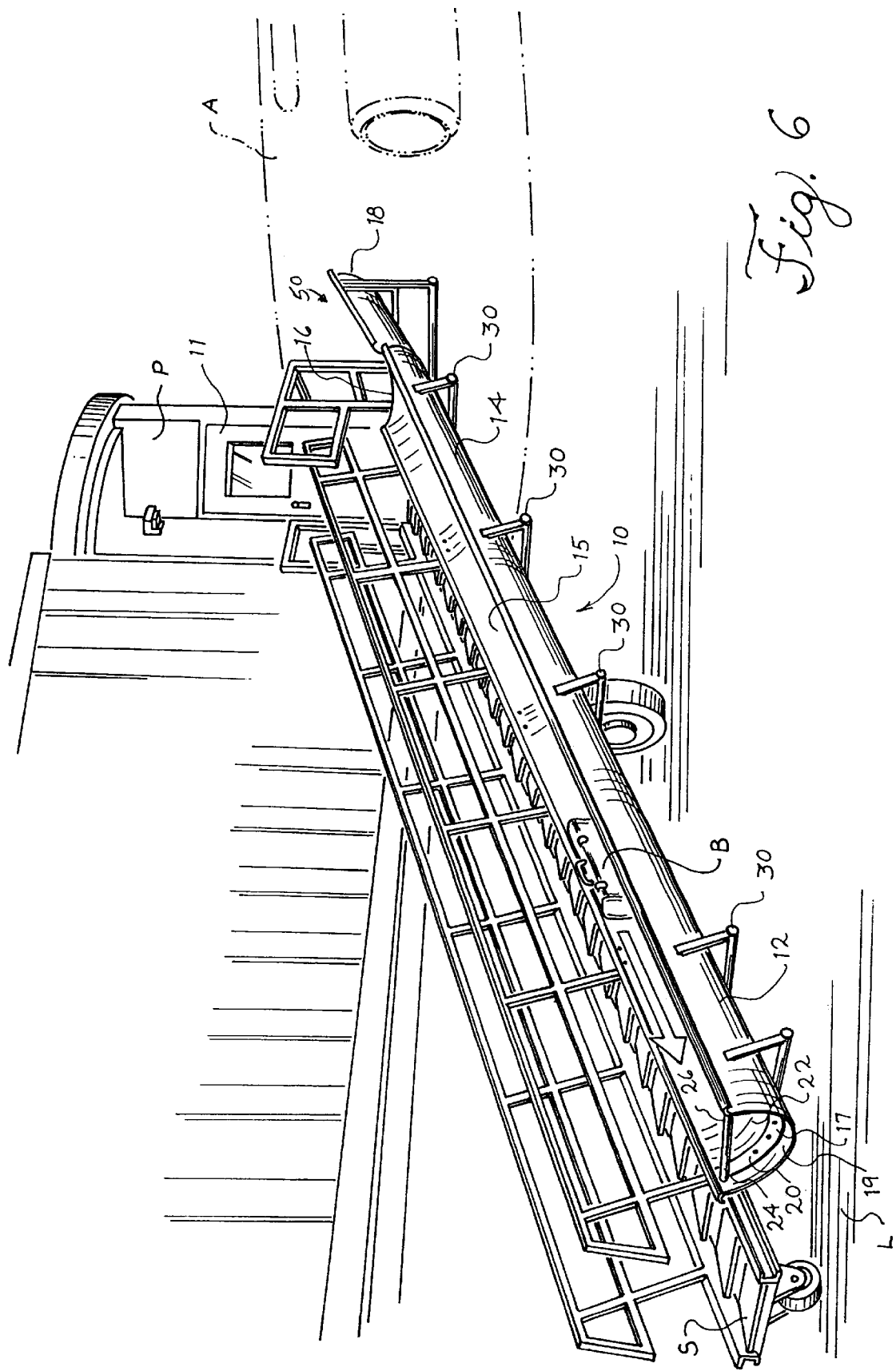
FIG. 6 is a perspective view of another embodiment of the present invention.

As shown in FIG. 1, a baggage chute 10 extends between the upper level of the aircraft passenger boarding bridge B to the lower ground level L where an aircraft A would sit prior to departure from and after arrival to an airport. Generally, because the boarding bridge B connects the inside of the airport to the aircraft A, passengers board and disembark from the aircraft A by walking through the elevated boarding bridge B. In this manner, passengers do not have to walk across the tarmac, or travel outside, to board or disembark from the aircraft A.

In addition, the boarding bridge B usually includes stairs S which connect the elevated or upper level boarding bridge B to the ground level L. The stairs S are used when airline personnel need to travel from the airport or the upper boarding bridge B level to ground level L. In the past, airline personnel would utilize the stairs S to carry baggage, luggage and the like of the passengers when the baggage needed to be placed into the baggage hold of the aircraft but had not been checked at the ticket counter or at the curb of the airport terminal.

The baggage chute 10 of the present invention is connected with the stairs S of the boarding bridge B. By utilizing the baggage chute 10, airline personnel do not have to walk baggage down the stairs S; instead, the airline personnel can slide the baggage down the baggage chute 10. In this manner, airline personnel do not have to carry heavy, large or cumbersome baggage down the stairs S, which obviously may be difficult and even dangerous.

As shown in FIGS. 1, 2 and 3, the baggage chute is generally comprised of at least one slide member 12 and one or more mounting members 30. The slide member 12 forms an elongated slide 14 which extends from an upper end 18 at the upper level of the boarding bridge B to a lower end 19 at ground level L. Although one slide member 12 is shown, a plurality of slide members 12 may be utilized to assemble a continuous chute without departing from the spirit and scope of this invention. If a plurality of slide members 12 are utilized, the slide members 12 are connected together to form the slide 14. In particular, a plurality of rigid braces (not shown) and fasteners may be provided to interconnect the one or more slide members. The braces are preferably curved so as to adapt to the contour of the slide members. Fasteners such as mounting bolts may secure the braces to each adjoining slide member.

Each slide member 12 is generally arcuate in cross-section and may preferably be constructed from widely available construction-grade ribbed drainage tubing. Preferably, each slide member 12 is shaped to form a truncated cylinder with a semi-circular cross-section. Preferably, each slide member 12 is made of polyvinyl chloride. Additionally, each slide member 12 has annularly extending ribs 20. The ribs 20 provide lateral support to the arcuate shape of the slide member 12. Preferably, the length of each slide member 12 is about 20 feet and the width is about 2 feet.

In one embodiment, as shown in FIG. 1, the slide member 12 includes at least one plastic sheet 15 covering the annularly extending ribs 20 on the surface of the slide member 12 which contacts the baggage B. The plastic sheet 15 is provided to decrease friction between the sliding baggage B and the interior surface of the slide member 12. Preferably, the sheet 15 is also made from polyvinyl chloride and is affixed to the interior ribbed surface of the slide member 12 by epoxy. The sheet 15 may also be made to conform to the projecting annular ribs 20 to provide slightly raised surfaces for added friction between the sheet 15 and sliding baggage.

As shown in FIG. 4, one or more mounting members 30 are utilized to fasten the slide member 12 to the passenger boarding bridge B and to support the slide member 12. Preferably, each mounting member 30 is comprised of three brackets that are joined together somewhat in a U-shape. In particular, the mounting member 30 is comprised of a lower bracket 32 and two side brackets 33, 34. Generally, the brackets 32, 33, 34 are joined together so that the side brackets 33, 34 are perpendicular to the lower bracket 32 to form the U-shape. Preferably, the brackets 32, 33, 34 are joined together by welding the brackets together. Alternatively, the brackets 32, 33, 34 may be joined together by fasteners, such as mounting bolts. While the lower bracket 32 is positioned underneath (relative to ground level L) the slide member 12, the side brackets 33, 34 support and are connected with the sides 12a, 12b of the slide 14. Preferably, the side brackets 33, 34 joined to the sides 12a, 12b of the slide 14 using fasteners, such as mounting bolts 77. Alternatively, the side brackets 33, 34 are joined to the sides 12a, 12b of the slide 14 by welding. Although not shown, the lower bracket 32 may also be connected to the slide member by using welding or by using mounting bolts.

As also shown in FIG. 4, the lower bracket 32 extends past the slide member 12 in the direction of the stairs S so that the lower bracket 32 is attached with the bottom portion of the stairs S. In particular, stair stringers 70a and 70b extend beneath the stairs S parallel to the slide 14, and provide a convenient method for attachment of the lower brackets 32 of the mounting members 30. The lower bracket 32 may be attached with the stair stringers 70a, 70b by any conventional means, such as by, for example, fasteners such as mounting bolts or welding the bracket 32 to the stair stringers 70a, 70b. In one embodiment, the lower bracket 32 includes a telescoping portion (not shown) to allow for stairway structure variations.

Preferably, the side brackets 33 and 34 of the mounting members 30 are 2 inch angle arms, while the lower bracket 32 is 2 inch tubing. The brackets 32, 33, 34 are preferably made from any well known type of steel. Also, preferably, the mounting members are positioned about 4 inches to about 5 inches from each other. While any number of mounting members 30 may be utilized to support the slide 14, preferably, there are 4 or 5 mounting members for the slide 14.

Preferably, as shown in FIGS. 1 and 2, at or near the lower end 19 of the slide 14, the baggage chute 10 includes a baggage receiving area 22. The baggage receiving area 22 receives and retains baggage from the slide 14. Preferably, the baggage chute 10 also includes a baggage holding means 40 which is positioned adjacent the baggage receiving area 22. The baggage holding means 40 is provided for retaining baggage B near or at ground level L after the baggage B travels down the slide 14. As shown in FIG. 5, the baggage holding means 40 includes a flexible member 42 which extends between the lower end 19 of the slide 14 and a baggage holding means mounting member 44. The baggage holding means mounting member 44 is preferably comprised of brackets that are joined together. In particular, as shown in FIG. 1, the baggage holding means mounting member 44 is first comprised of a lower bracket 46 and two side brackets 48, 50. Generally, the brackets 46, 48, 50 are joined together so that the side brackets 48, 50 are perpendicular to the lower bracket 46 to form a U-shape. In particular, the lower ends of the side brackets 48, 50 are attached to the lower bracket 46. Preferably, the brackets 46, 48, 50 are joined together by welding the brackets together. Additionally, an upper bracket (not shown) is positioned between the upper ends of the side brackets 48, 50. Preferably, the lower bracket 46 is attached with the stairs S. Preferably, the brackets 46, 48, 50 are comprised of 2 inch angle arms or 2 inch tubing, and are made from any well known type of steel, while the upper bracket is preferably a C channel also made from any well known type of steel.

Accordingly, as shown in FIGS. 1, 2 and 5, the baggage holding means 40 is comprised of the flexible member 42 being attached between the slide 14 and the upper bracket of the baggage holding means mounting member 44. In particular, one end 52 of the flexible member 42 is connected with the slide 14 and the remainder of the flexible member 42 is positioned so that the flexible member 42 extends in the direction of the baggage holding means mounting member 44 and is attached to the upper bracket of the baggage holding means mounting member 44. The flexible member 42 may be attached with the slide 14 by any conventional means such as by, for example, fasteners such as mounting bolts 78. Similarly, the flexible member 42 may be attached to the upper bracket of the baggage holding means mounting member 44 by any conventional means such as mounting bolts.

While the flexible member 42 may be wider than or narrower than the slide 14, preferably, the flexible member 42 and the slide 14 have similar widths. Preferably, the flexible member 42 has a thickness of at least 0.125 inches. The flexible member 42 may be made of a rubber sheet or a rubber-canvas composite. Preferably, the flexible member 42 is made of belting, which is used on conveyors, especially those used in an airport's baggage handling system. In this embodiment, the flexible member has a width of about 30 inches.

As shown in FIG. 6, in another embodiment, the baggage receiving area 22 includes a bumper member 24 which extends substantially across the receiving area 22. The bumper member 24 stops the sliding of the baggage B down the slide 14 and absorbs a portion of the impact between the baggage B and the bumper member 24 when the baggage B slides into the bumper member 24. Preferably, the bumper member 24 includes a rod member 26 which extends diametrically across the baggage receiving area 22. The rod member 26 is preferably substantially straight and is normal to the direction of travel of baggage B. In one embodiment, the outer surface of the rod member 26 incorporates an elastomeric padding so as to lessen the impact between the baggage B and the bumper member 24. The elastomeric padding may be comprised of rubber or expanded foam material.

As also shown in FIG. 6, in a preferred embodiment, the baggage chute 10 also includes a loading area or portion 50 positioned adjacent the upper end 18 of the slide 14. The loading area 50 is provided to facilitate the loading of baggage B onto the slide 14 from the stairs S. While the slide 14 generally has a constant slope from its upper end 18 to its lower end 19, the loading area 50 may be an area of the slide 14 which has a lower slope than most of the slide 14. In order to have more area in which to place baggage B from the stairway S onto the slide 14, the slide 14 may include at least one truncated side wall portion 16 positioned near the loading area 50. Preferably, the loading area 50 includes a section of the slide 14 which may be disconnected from the slide 14 and is articulatable relative to the slide 14. This allows the loading area 50 of the slide 14 to be positioned at various angles relative to the ground L.

Preferably, the slide member 12 include drainage means to prevent the accumulation of water on the slide 14. Preferably, the underside of the ribs 20 of the slide 14 defines a plurality of drainage holes (not shown). The drainage holes are included so that, in the event of rain during the use of the present invention, water may drain through the holes so as not to accumulate on the slide, especially in the baggage receiving area. The drainage holes may be any particular number, size and configuration, such as oval, round, square and the like.

In addition, as shown in FIGS. 1, 2 and 3, the baggage chute 10 includes one or more wheels 60 which are positioned near the ground level L of the stairs S and the slide 14. The wheels 60 allow the slide 14 and stairs S to move in both the vertical and horizontal directions as the bridge B is moved to accommodate different sizes of aircraft A.

During use, baggage B is transferred from the elevated boarding bridge B to the upper end of the slide 14, preferably via a doorway 11. Then, the baggage item B is allowed to slide down the slide 14 and to come to rest against the baggage holding means 40 at least partially within the baggage receiving area 22. Next, the baggage B is retrieved from the baggage receiving area 22 at the lower end of the slide 14. Last, the baggage B is then placed into the baggage hold of the aircraft A.

In another embodiment, the boarding bridge B is raised from a first elevation to a second elevation, the second elevation being above the first elevation, so that the slope of the slide increases in proportion to the raising of the loading bridge.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A baggage chute assembly for transferring baggage from an elevated level of an aircraft passenger boarding bridge to ground level, said chute assembly comprising:

at least one corrugated slide member, said slide member having an arcuate cross-section, annularly extending ribs formed by said corrugations and providing an elongated slide extending from said elevated level of said boarding bridge to ground level;

a plurality of mounting members fastening said slide to said boarding bridge;

a baggage receiving area comprising a flexible member and attached near an end of said slide near ground level for receiving and retaining said baggage from said slide and, at least one plastic sheet covering an interior surface of said slide.

2. The baggage chute assembly of claim 1 further comprising stairs connecting the elevated level with ground level, said mounting members attached with said stairs.

3. The baggage chute assembly of claim 2 wherein mounting members are comprised of a lower bracket and two side brackets attached with said lower bracket to form a U-shaped mounting member.

4. The baggage chute of claim 3 wherein said side brackets are attached with said slide.

5. The baggage chute of claim 3 wherein said lower bracket extends past said slide and is attached with said stairs.

6. The baggage chute of claim 1 wherein said baggage receiving area includes baggage holding means comprised of a flexible member and a baggage holding means mounting member, wherein said flexible member extends substantially across said receiving area, and said flexible member is adapted to absorb a portion of the impact between said flexible member and said baggage upon contact between said flexible member and said baggage.

7. The baggage chute of claim 6 wherein said baggage holding means mounting member is comprised of a lower bracket, two side brackets, each side bracket having a lower end and an upper end, and an upper bracket, wherein said lower bracket is attached to the lower ends of the side brackets and said upper bracket is attached to the upper ends of the side brackets.

8. The baggage chute of claim 7 wherein said flexible member is connected with said slide and also extends in the direction of said baggage holding means mounting member and is attached to said upper bracket of said baggage holding means mounting member.

9. The baggage chute of claim 6 wherein said flexible member is made of conveyor belt material.

10. The baggage chute of claim 1 wherein said slide further comprises polyvinyl chloride.

11. The baggage chute of claim 1 wherein said slide further comprises at least one plastic sheet covering said annularly extending ribs on the interior surface of said slide.

12. The baggage chute of claim 1 wherein said bottom surface of said annularly extending ribs defines a plurality of drainage holes.

13. The baggage chute of claim 1, further comprising a loading area on an upper end of said slide member, to facilitate the loading of baggage onto said slide from said stairway.

* * * * *

UNITED STATES PATENT AND TRADEMARK OFFICE
CERTIFICATE OF CORRECTION

PATENT NO. : 6,401,901 B1  Page 1 of 1
APPLICATION NO. : 09/192176
DATED : June 11, 2002
INVENTOR(S) : Daniel Bracken et al.

It is certified that error appears in the above-identified patent and that said Letters Patent is hereby corrected as shown below:

In the Claims

In claim 1, line 14, delete "," (comma) immediately after "and" and substitute --;-- (semicolon) in its place.

Signed and Sealed this

Seventeenth Day of April, 2007

JON W. DUDAS
*Director of the United States Patent and Trademark Office*